United States Patent [19]

Okamoto et al.

[11] Patent Number: 4,909,587
[45] Date of Patent: Mar. 20, 1990

[54] FIBRE-TYPE LIGHT CONVERSION DEVICE

[75] Inventors: Sota Okamoto; Kiyofumi Chikuma, both of Saitama, Japan

[73] Assignee: Pioneer Electronic Corporation, Tokyo, Japan

[21] Appl. No.: 354,815

[22] Filed: May 22, 1989

[30] Foreign Application Priority Data

May 20, 1988 [JP] Japan .................. 63-123415

[51] Int. Cl.⁴ .............................. G02B 6/34
[52] U.S. Cl. .................. 350/96.19; 350/452; 307/427
[58] Field of Search ............ 350/96.19, 452; 307/425–430

[56] References Cited

U.S. PATENT DOCUMENTS 4,726,662  2/1988  Cromack .................. 350/452 X
4,824,227  4/1989  Goldenberg et al. ............. 350/452

FOREIGN PATENT DOCUMENTS 61-50122   3/1986  Japan .
3254424   10/1988  Japan .................. 307/427

Primary Examiner—John D. Lee
Assistant Examiner—Phan T. Heartney
Attorney, Agent, or Firm—Fleit, Jacobson, Cohn, Price, Holman & Stern

[57] ABSTRACT

A fibre-type light wavelength conversion device comprises a fibre-type wavelength conversion element for changing the wavelength of an incident light and a prismatic means for transforming said incident light, whose wavelength has been changed by said wavelength conversion element, into a parallel light, wherein said prismatic means is a Fresnel lens comprised of a plurality of concentric conical ring zones whose cross-section including its optical axis has a saw-tooth shape or comprised of a same pitch circular grating. Furthermore, a vertical angle of a surface of emergence of said conical ring zones is determined so as to satisfy the following equations of:

$$\sin x = n \cdot \sin y$$

$$y + z = (\pi/2) - \alpha$$

$$\cos \alpha = n \cdot \sin z$$

where x represents an angle of incidence of said incident light with respect to said optical axis of said Fresnel lens, n represents a refractive index of said Fresnel lens, y represents an angle of refraction at a surface of incidence, and z represents an angle of incidence into said surface of emergence.

1 Claim, 2 Drawing Sheets

SECOND HARMONIC
LIGHT RING

FIBRE-TYPE LIGHT CONVERSION DEVICE

BACKGROUND OF THE INVENTION

1. Field of the Invention

The present invention relates to a fibre-type light conversion device.

2. Description of Background Information

An optical pickup is known by which high density writing and reading of information on and from a disc are enabled by transforming the wave length of a laser beam emitted from a laser source to a half the original wavelength by means of a light conversion device (Japanese Patent Application Laid-Open No. 61-50122).

As the light conversion device for use in this pickup, there is an optical fibre type SHG (Second Harmonics Generator) using a second-order non-linear optical effect. A phase matching of Cerenkov radiation system is adopted in the optical fibre type SHG. With this system, it is possible to generate a second harmonic wave whose phase matching condition is attained almost automatically. The general conception of this device is shown in FIGS. 1A and 1B.

In FIG. 1A, when the fundamental wave mode is propagated through the core with the effective reflective index of $N(\omega)$, the non-linear polarizing wave generating the SH wave is also propagated at the same phase velocity $C/N(\omega)$ (C is the speed of light in a vacuum). It is assumed that this non-linear polarizing wave produces the SH wave in a direction making an angle $\theta$ with respect to the direction of the wave guide at a point A, and generates the SH wave in the direction of $\theta$ as before at a point B, after the elapse of a unit time. If the SH wave generated at the point A propagates through the clad and reaches to a point C after the elapse of a unit time and the angle $\theta$ is such an angle that lines AC and BC are perpendicular to each other, then the plane of the SH wave which is generated from the non-linear polarized wave becomes equal to BC, and as a result, a coherent SH wave is generated.

The condition of the phase matching is, according to the figure, as follows:

$$N(\omega) = N_{clad}(2\omega) \cos\theta \quad (1)$$

In other words, $$N(\omega) < N_{clad}(2\omega) \quad (2)$$

This means that the SH is generated automatically in the direction where the phase matching condition is performed when at least the condition mentioned by the equation (2) is satisfied. Generally, with the refractive indices of the clad and core with respect to the fundamental wave being $n_{clad}(\omega)$ and $n(\omega)$, and with the air as the over-layer, the condition for the fundamental wave to propagate through the core as the mode is expressed as:

$$N_{clad}(\omega) < N(\omega) < n(\omega) \quad (3)$$

Wavelength dispersion of the clad's refractive index will now be considered. Since $n_{clad}(\omega) < n_{clad}(2\omega)$, if the equation (2) is satisfied for all of the fundamental wave modes irrespectively of the diameter of the core so far as the following expression (4) is satisfied.

$$N_{clad}(\omega) < N(\omega) < n_{clad}(2\omega) \quad (4)$$

Moreover, there are fundamental modes satisfying the equation (2) in a certain range of the diameter of core even under the following condition.

$$N_{clad}(\omega) < n_{clad}(2\omega) < n(\omega)$$

The second harmonic wave generated in this way is propagated in a clad mode as illustrated in FIG. 1B in which total reflection occurs repeatedly at the boundary between the clad and air. Then, the second harmonic wave is emitted in conical shape from the end of fibre in directions making an angle $\theta$ relative to the fibre's direction. The equiphase front of the second harmonic wave emitted in this way is in a conical surface with an axis on the central axis of the fibre.

In order to efficiently apply this second harmonic wave in the opto-electronics, it is desirable to give the emitted wave surface a plane form. As illustrated in FIG. 2, it is conceivable to dispose a conical prism 20 with a conical surface having vertical angle of $2\alpha$ in the optical path of the beam emitted from the wavelength conversion device 10, and the conical equiphase front can be converted to a planer equiphase front by collimating the second harmonic wave (making it parallel) by means of the function of the conical prism 20.

However, if it is attempted to make the conical prism 20 from a material such as plastics, there arises a problem that the so-called "shrinkage cavity" or "deformation" is generated during the moulding of plastics, because the thickness is largest at the central position of the prism in the case of the prism having a conical shape. Moreover, it is generally difficult to eliminate the "shrinkage" or "deformation" mentioned above.

OBJECT AND SUMMARY OF THE INVENTION

The present invention has been made in view of the above-described point, and an object of the present invention is to provide a fibre-type light conversion device which is adapted such that the second harmonic wave is collimated by means of an optical part which can be produced in large quantities at a low price.

The fibre-type light wavelength conversion device according to the present invention has a construction in which a Fresnel lens comprised of a plurality of conical ring zones and having a saw-tooth cross-section or comprised of a same pitch circular grating is provided as a prism for converting the light, whose wavelength is changed by the light wave-length converting device, into a parallel light.

DETAILED DESCRIPTION OF THE PREFERRED EMBODIMENT

The preferred embodiment of the present invention will be explained with reference to the accompanying drawings hereinafter.

Figure 1A:
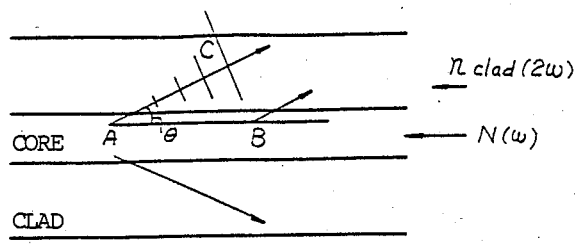
FIGS. 1A and 1B are diagrams for explaining the concept of Cerenkov radiation system phase matching SHG.
Figure 1B:
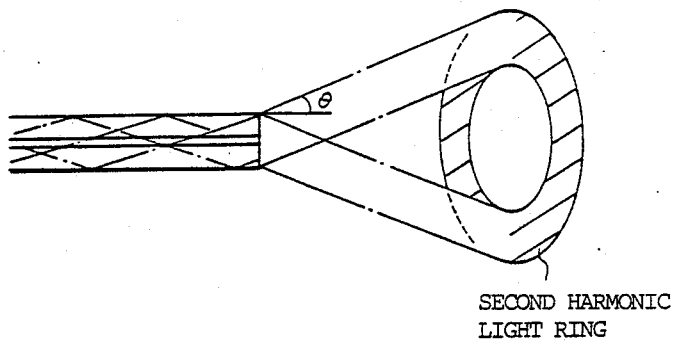
Figure 2:
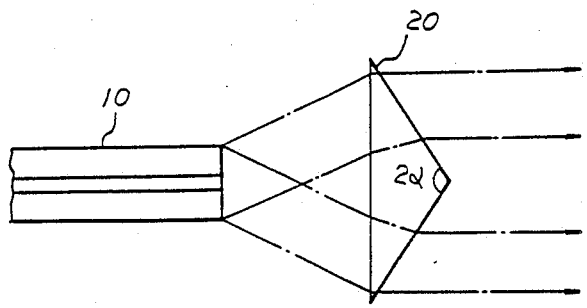
FIG. 2 is a diagram for explaining the concept of collimating the second harmonic wave by means of a conical prism.
Figure 3:
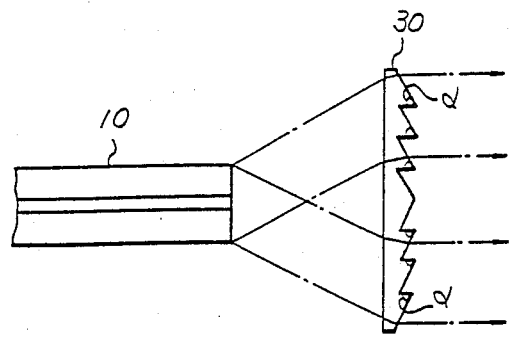
FIG. 3 is a diagram showing the structure of an embodiment of the light wavelength conversion device according to the present invention.

In FIG. 3, a second order light which is a second harmonics wave emitted from a fibre-type light wavelength conversion device 10 is received by a Fresnel lens 30. The fresnel lens 30 is configured such that distance from the optical axis to the conical prism surface of the conical prism 20 shown in FIG. 2 is concentrically divided, forming a plurality of conical ring zones and forming a saw-tooth cross section or forming a same pitch circular grating. In each conical ring zone, the refracting surface is configured such that it forms a part of the conical surface having the vertical angle of $2\alpha$, and the vertical angle of the refracting surface in each conical ring zone is equal to $\alpha$. In this manner, the Fresnel lens 30 is used as an optical part which converts the secondary light into a parallel light. With this feature, it is made possible to reduce the thickness of the optical part. Moreover, the number of division to form the conical ring zones can be determined arbitrarily, and the greater the number of divisions to form the conical ring zones becomes, the thinner the Fresnel lens can be made.

For the production of the Fresnel lens 30, a metal mould is produced, for example, by means of a computer-controlled manufacturing machine, and the Fresnel lenses are produced in large quantities at a low price by employing a mould injection of a plastic material.

The function of the Fresnel lens 30 in the structure explained above is described hereinafter.

Figure 4:
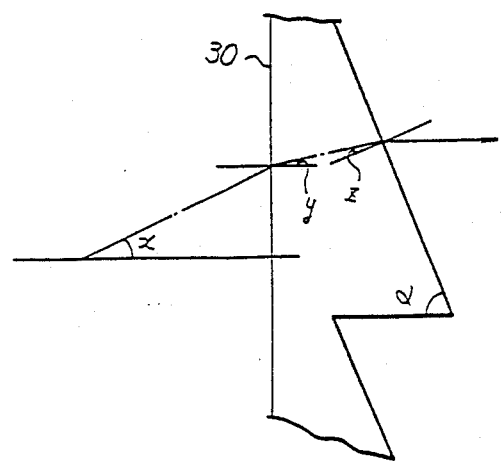
FIG. 4 is a diagram for explaining the function of the Fresnel lens used in the device shown in FIG. 3.

The second harmonic wave whose wave-length has been changed by means of the fibre-type wavelength conversion device 10 enters into the Fresnel lens 30, where the second harmonic wave is emitted from each of the conical ring zones after being refracted at the surface of incidence, then further refracted at the surface of emergence. As illustrated in FIG. 4, when the angle of incidence of the incident light with respect to the optical axis of the Fresnel lens is denoted by x, the refraction index at the surface of incidence is denoted by n, the refraction angle at the surface of incidence is denoted by y, and the angle of incidence into the surface of emergence is denoted by z respectively, the incident light is collimated by each of conical ring zones if the vertical angle $\alpha$ of the surface of emergence at each of the conical ring zone is determined to satisfy the following equations:

$$\sin x = n \sin y$$

$$y + z = (\pi/2) - \alpha$$

$$\cos \alpha = n \sin z$$

In this way, the second harmonic wave is converted to a parallel light by means of the Fresnel lens 30.

As will be appreciated from the foregoing description, the fibre-type light wavelength conversion device according to the present invention has a construction in which a Fresnel lens is used as a prism for converting the incident light into the parallel light, after the wavelength of the incident light has been changed by light wavelength conversion device. Therefore, the second harmonic wave can be collimated by means of the Fresnel lens which can be produced by the injection mould of a plastic material in large quantities at one time.

We claim:

1. A fibre-type light conversion device comprising:
    a fibre-type light conversion element for changing the wavelength of an incident light; and
    a prismatic means for transforming said incident light, whose wavelength is changed by said light conversion element, into a parallel light, wherein said prismatic means is a Fresnel lens comprised of a plurality of concentric conical ring zones whose cross-section including its optical axis has a sawtooth shape or a same pitch circular grading, and a vertical angle $\alpha$ of a surface of emergence of each of said conical ring zones is determined so as to satisfy the following equations:

$$\sin x = n \sin y$$

$$y + z = (\pi/2) - \alpha$$

$$\cos \alpha = n \sin z$$

where x represents an angle of incidence of said incident light with respect to said optical axis of said Fresnel lens, n represents a refractive index of said Fresnel lens, v represents an angle of refraction at a surface of incidence, and z represents an angle of incidence into said surface of emergence.

* * * * *